United States Patent [19]

Altermatt

[11] 3,972,881
[45] Aug. 3, 1976

[54] TRIAZINYL DYES
[75] Inventor: Hans Altermatt, Reinach, Switzerland
[73] Assignee: Ciba-Geigy Corporation, Ardsley, N.Y.
[22] Filed: Aug. 19, 1974
[21] Appl. No.: 498,698

[30] Foreign Application Priority Data
Aug. 22, 1973 Switzerland.............. 12067/73
June 6, 1974 Switzerland.............. 7727/74

[52] U.S. Cl............... 260/249; 260/249.8; 8/54.2
[51] Int. Cl.² .................... C07D 251/52
[58] Field of Search............ 260/249, 249.8

[56] References Cited
UNITED STATES PATENTS
3,787,406  1/1974  Ulrich et al................ 260/249

Primary Examiner—John M. Ford
Attorney, Agent, or Firm—Joseph G. Kolodny; Edward McC. Roberts; Prabodh I. Almaula

[57] ABSTRACT

Vat dyestuffs of the formula

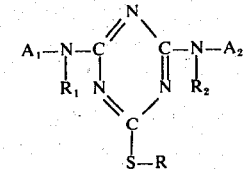

(1), wherein R represents alkyl with 1 to 4 carbon atoms, $R_1$ and $R_2$ represent hydrogen or alkyl with 1 to 4 carbon atoms and each of $A_1$ and $A_2$ represents a vattable radical with 3 to 7 condensed rings are characterized by improved resistance to alkali and are suitable for dyeing and printing the most diverse materials, in particular fibers made from natural or regenerated cellulose.

3 Claims, No Drawings

TRIAZINYL DYES

The present invention provides vat dyestuffs of the formula (1), a process for their manufacture and a method of using them for dyeing and printing textile materials. The invention also provides the textile material which is dyed or printed with the vat dyestuffs of the formula (1).

The vat dyestuffs have the formula

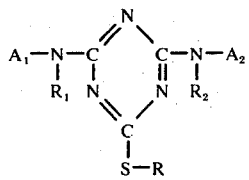

(1)

wherein R represents alkyl with 1 to 4 carbon atoms, $R_1$ and $R_2$ represent hydrogen or alkyl with 1 to 4 carbon atoms and each of $A_1$ and $A_2$ represents a vattable radical with 3 to 7 condensed rings.

In the vattable dyestuffs of the formula (1), $R_1$ and $R_2$ preferably represent hydrogen. The vattable radicals $A_1$ and $A_2$ can be the same or not the same; preferably, however, $A_1$ and $A_2$ are the same.

Possible vattable radicals $A_1$ and $A_2$ are radicals of polycyclic quinoid compounds, for example anthrapyrimidines, anthrapyridones, anthrapyrimidones, azabenzanthrones, benzanthrones, anthanthrones, anthrimides, anthrimide carbazoles, isothiazolanthrones, pyrazolanthrones, pyrimidanthrones, anthraquinone compounds which are derived from 9,10-dioxoanthracenes and optionally contain further fused carbocyclic and heterocyclic rings, for example quinazolinanthrones, oxadiazolanthraquinones, pyrazolanthraquinones, pyrazinoanthraquinones and preferably radicals of 3,4-phthaloylacridones bound in 2- or 8-position as well as radicals of anthraquinones bound in 1- or 2-position. All these radicals can carry the customary substituents for vat dyestuffs. Examples of such substituents are: halogen atoms, especially chlorine, fluorine or bromine, alkyl, alkoxy, aryl, aryloxy, aralkyl, aralkoxy, arylamino, alkylthio, arylthio, cyano and thiocyano groups. Throughout this specification, "alkyl" denotes in particular radicals with 1 to 4 carbon atoms, "aryl" denotes in particular radicals such as phenyl, tolyl, chlorophenyl, methoxyphenyl or naphthyl radicals, and "aralkyl" denotes in particular the benzyl radical. The acyl and acylamino groups are also particularly important substituents. The term "acyl" chiefly encompasses radicals of aromatic carboxylic or sulphonic acids, especially those of the benzene series or low molecular alkanoyl or alkylsulphonyl radicals (i.e. with 1 to 4 carbon atoms), for example the acetyl, benzoyl, p-chlorobenzoyl, p-phenylbenzoyl, benzenesulphonyl or p-toluenesulphonyl radical, also low molecular alkoxycarbonyl radicals and sulphonamide or carboxy amide groups the nitrogen atom of which can be substituted by alkyl or aryl radicals, for example the ethoxycarbonyl, aminocarbonyl or aminosulphonyl radical.

Preferred vat dyestuffs are therefore those of the formula

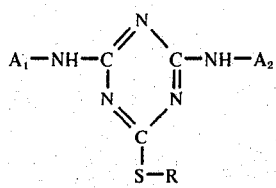

(2)

wherein each of $A_1$ and $A_2$ represents a 3,4-phthaloylacridone radical bound in 2- or 8-position or an anthraquinone radical bound in 1- or 2-position, and $A_1$ and $A_2$ can carry the substituents mentioned hereinabove, and R has the meaning assinged to it in respect of the formula (1).

Among the vat dyestuffs of the formula (2), particular importance attaches to those of the formula

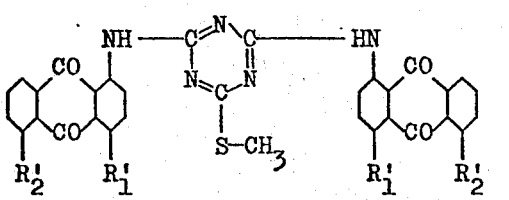

(3)

wherein one of the two substituents $R'_1$ and $R'_2$ represents hydrogen and the other represents benzoylamino.

The vat dyestuffs of the formula (1) are manufactured by a. condensing a trihalo-s-triazine of the formula

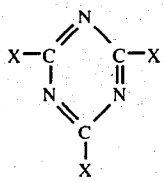

(4)

wherein X represents halogen, with vattable amines of the formulae

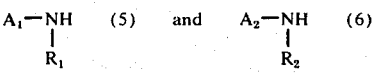

and with an alkylthiol of the formula HS-R (7). The symbols $A_1$, $R_1$, $A_2$, $R_2$ and R have the same meanings as previously assigned to them in respect of the formula (1). The partial reactions of the process can be carried out in any desired sequence.

It is therefore possible to react a trihalo-s-triazine of the formula (4) first with a vattable amine of the formula (5) to give the corresponding amino-dihalo-s-triazine, then to react this with a second vattable amine of the formula (6) to give the corresponding diaminohalo-s-triazine, and finally to react this compound with an alkylthiol of the formula (7) to give the vat dyestuff of the formula (1). Instead of an alkylthiol, it is also possible to use a corresponding alkali mercaptide. The reaction of the trihalo-s-triazine of the formula (4) with the vattable amines of the formulae (5) and (6) can also take place simultaneously by using a mixture of the required amounts of both vattable amines for the first partial reaction. In another embodiment of the process according to the invention, a trihalo-s-triazine of the formula (4) is condensed first with an alkylthiol of the formula (7) to give the corresponding alkylthiodihalo-s-triazine, which is then reacted in succession or simultaneously with vattable amines of the formulae (5) and (6) to give the vattable dyestuff of the formula (1).

If the halo-s-triazine is reacted with the vattable amines of the formulae (5) and (6) in succession, then the condensation with the alkylthiol of the formula (7) can also be carried out after the first condensation with the vattable amine of the formula (5) and before the second condensation with the vattable amine of the formula (6).

The preferred vat dyestuffs of the formula (1), wherein $A_1$ and $A_2$ are the same, are obtained by condensing 1 mole of trihalo-s-triazine of the formula (4) or 1 mole of alkylthiodihalo-s-triazine with 2 moles of a vattable amine in one reaction step and, if a trihalo-s-triazine of the formula (4) is used as starting material, by subsequently reacting the condensation porduct with an alkylthiol of the formula (7). In analogy to the embodiments described hereinbefore, it is also possible to react 1 mole of trihalo-s-triazine of the formula (4) or 1 mole of alkylthiodihalo-s-triazine first with 1 mole of a vattable amine and then again with 1 mole of the same vattable amine. If a trihalo-s-triazine of the formula (4) is used as starting material, the condensation with the alkylthiol of the formula (7) can also be carried out after the condensation with the first mole and before the condensation with the second mole of the vattable amine.

In the manufacture of the vat dyestuffs of the formula (1), it is advantageous
b. to use as starting material an already available alkylthiodihalo-s-triazine and to react this compound in a single or two step reaction as described hereinbefore with vattable amines of the formulae (5) and (6) to give the vat dyestuff of the formula (1). The alkylthiodihalo-s-triazines used as starting materials are known. They can be obtained by reaction of trihalo-s-triazines of the formula (4) with an alkali sulphide and subsequent reaction with an alkyl halide or, as described hereinbefore, by reaction of trihalo-s-triazines of the formula (4) with alkylthiols of the formula (7) or with a corresponding alkali mercaptide.

A modification of the process b) consists in
c. condensing a diamino-alkylthio-s-triazine of the formula (4), in which one X represents an amino group of the formula —N($R_1$)H, the second X represents an amino group of the formula —N($R_2$)H and the third X represents an alkylthio group of the formula —S—R, in succession or simultaneously with vattable compounds of the formulae $A_1$—Y  (8)    and $A_2$—Z   (9), wherein Y and Z represent halogen atoms. The radicals $R_1$, $R_2$ and R and the radicals $A_1$ and $A_2$ in the formulae (8) and (9) have the same meanings assigned to them as under thr formula (1). The diamino-alkylthio-s-triazines required as starting materials are obtained by condensation of trihalo-s-triazines of the formula (4) with ammonia or primary alkylamines to give diamino-halo-a-triazines and by further reaction of these intermediates with alkylthiols of the formula (7), accompanied by the splitting off of hydrogen chloride, to give diamino-alkylthio-s-triazines.

If the manufacture of the diamino-alkylthio-s-triazine is incorporated into the overall process for the manufacture of the vat dyestuffs of the formula (1), then in this case too, i.e. as in the process described under (a), other process modifications are possible by altering the sequence of the partial reactions. For example, 1 mole of a trihalo-s-triazine of the formula (4) is reacted first with 2 moles of ammonia or with 2 moles of a mixture of a primary alkylamine, optionally also with 2 moles of a mixture of ammonia and a primary alkylamine or of two primary amines, to give an diamino-halo-s-triazine. The resulting diamino-halo-s-triazine is then reacted with vattable compounds of the formulae (8) and (9) and subsequently with an alkylthiol of the formula (7). The condensation reactions of the diamino-halo-s-triazines with the vattable compounds of the formulae (8) and (9) can be carried out simultaneously or in succession. In this latter case, it is also possible to perform the condensation with the alkylthiol of the formula (7) after the first condensation of the diamino-halo-s-triazine with the vattable compound of the formula (8) and before the second condensation with the vattable compound of the formula (9).

The preferred vat dyestuffs of the formula (2) are obtained by condensing according to the process as described under b) an alkylthio-dichloro-s-triazine of the formula

(10)

wherein R has the meaning assigned to it in respect of the formula (1), with vattable amines of the formula $A_1$—$NH_2$   (11)     and $A_2$—$NH_2$   (12)

wherein each of $A_1$ and $A_2$ represents a 3,4-phthaloylacridone radical, to which the $H_2N$ group is bound in 2- or 8-position, or anthraquinone radical to which the $H_2N$ group is bound in 1- or 2-position. The most preferred vat dyestuffs of the formula (3) are obtained by condensation of the methylthiodichloro-s-triazine with an aminoanthraquinone of the formula

(13)

wherein one of the two substituents $R_1'$ and $R_2'$ represents hydrogen and the other represents benzoylamino, in the molar ratio 1:2.

The condensation reactions described herein are carried out in known manner.

Particularly suitable s-triazines of the formula (4) which can be used in the present process in accordance with embodiment (a), or from which the akylthiodihalo-s-triazines or diaminoalkylthio-s-triazines required as starting materials in accordance with embodiments (b) and (c) are manufactured, are cyanuric chloride and cyanuric bromide. The most important alkylthiodihalo-s-triazines are:

2-methylthio-4,6-dichloro-s-triazine,
2-ehtylthio-4,6-dichloro-s-triazine,
2-propylthio-4,6-dichloro-s-triazine,
2-isopropylthio-4,6-dichloro-s-triazine,
2-butylthio-4,6-dichloro-s-triazine.

Important diamino-alkylthio-s-triazines are:

2,4-diamino-6-methylthio-s-triazine,
2,4-diamino-6-ethylthio-s-triazine,
2,4-diamino-6-propylthio-s-triazine,
2,4-diamino-6-isopropylthio-s-triazine,
2,4-diamino-6-butylthio-s-triazine,
2,4-di-N-methylamino-6-methylthio-s-triazine,
2-amino-4-N-methylamino-6-methylthio-s-triazine,
2,4-di-N-ethylamino-6-methylthio-s-triazine.

Examples of vattable amines of the formulae (5) and (6) are:
1-aminoanthraquinone,
1-amino-4-methoxyanthraquinone,
1-amino-4-acetylaminoanthraquinone,
1-amino-4-benzoylamino-anthraquinone,
1-amino-4-(p-toluolsulphonylamino)-anthraquinone,
1-amino-4(p-chlorobenzoylamino)-anthraquinone,
1-amino-4-anilido-anthraquinone,
1-amino-4-[p-(N,N-dimethylsulphamido)-benzoylamino]-anthraquinone,
1-amino-4-phenylthio-anthraquinone,
1-amino-4-(4'-phenyl-benzoylamino)-anthraquinone,
1-amino-4-chloroanthraquinone, and the corresponding 1-aminoanthraquinones which are substituted in 5- or 8-position instead of in 4-position.

2-amino-anthraquinone,
1-amino-2-methyl-anthraquinone,
1-amino-3-chloro-anthraquinone,   1-amino-6,7-dichloro-anthraquinone,
1-amino-6-phenylthio-anthraquinone,
1-amino-7-phenylthio-anthraquinone,
1-amino-6-chloro-7phenylthio-anthraquinone,
1-amino-7-chloro-6-phenylthio-anthraquinone,
1,4-diamino-2-acetyl-anthraquinone,
2-amino-3-chloro-anthraquinone,
2-amino-4-chloro-anthraquinone,
1-amino-2-chloro-anthraquinone,
1-amino-6-chloro-anthraquinone,
1-amino-3-chloro-6-methyl-anthraquinone,
1-amino7-chloro-anthraquinone,
2-amino-3,4-phthaloylacridone,
2-amino-6- or -7-chloro-3,4-phthaloylacridone,
2-amino-6-trifluoromethyl-3,4-phthaloylacridone,
2-amino-5,7-dichloro-3,4-phthaloylacridone,
2-amino-1,7-dichloro-3,4-phthaloylacridone,
8-amino-5-chloro-3,4-phthaloylacridone,
7-amino-1,2-benzo-5,6-phthaloylacridone,
aminoanthanthrone,
aminoisothiazolanthrone,
1-N-methylamino-anthraquinone,
1-N-propylamino-anthraquinone,
1-N-ethylamino-7-chloro-anthraquinone.
2-N-methylamino-anthraquinone,
2-N-methylamino-3,4-phthaloylacridone,
4-amino-1,1'-dianthrimide-2,2'-carbazole,
4,4-diamino-1,1'-dianthrimide-2,2'-carbozole, Particularly suitable vattable compounds of the formulae (8) and (9) are those in which the halogen atoms Y and Z are chlorine and/or bromine atoms. Examples of suitable vattable compounds of the formulae (8) and (9) are:

1-chloroanthraquinone,
1,3-dichloroanthraquinone,
1,5-dichloroanthraquinone,
1,6-dichloroanthraquinone,
1,8-dichloroanthraquinone,
1-bromoanthraquinone,
1,5-dibromoanthraquinone,
1,8-dibromoanthraquinone,
2-chloroanthraquinone,
2,6-dichloroanthraquinone,
2,7-dichloroanthraquinone,
2-bromoanthraquinone,
2,6-dibromoanthraquinone,
2,7-dibromoanthraquinone,
1-chloro-5-acetylaminoanthraquinone,
1-chloro-4-benzoylaminoanthraquinone,
1-chloro-4-(p-chlorobenzoylamino)-anthraquinone,
1-bromo-4-benzoylaminoanthraquinone,
1-bromo-4-(4'-phenylbenzoylamino)-anthraquinone,
1-chloro-5-benzoylaminoanthraquinone,
1-chloro-5-(p-chlorobenzoylamino)-anthraquinone,
1-bromo-5-benzoylaminoanthraquinone,
1-chloro-2-methylaminoanthraquinone,
1-chloro-4methylanthraquinone,
1-chloro-4methoxyanthraquinone,
1-bromo-2-methoxyanthraquinone,
1-bromo-4-methoxyanthraquinone,
1-chloro-3-acetyl-4-amino-anthraquinone,
1-chloro-4-anilido-anthraquinone,
1-chloro-4-phenylthio-anthraquinone,
1-chloro-5-phenylthio-anthraquinone,
2-chloro-3,4-phthaloylacridone,
2,5,7-trichloro-3,4-phthaloylacridone,
Bz-1-chlorobenzanthrone,
Bz-1-bromobenzanthrone,
6-Bz-1-dichlorobenzanthrone,
6-Bz-1-dibromobenzanthrone,
dichloroanthanthrone,
dibromoanthranthrone,
dibromobenzpyrenequinone,
tribromopyranthrone.

In embodiment (c), the use of CuI-pyridine catalyst as described in French Pat. No. 1 603 058 is advantageous.

If the vattable amine of the formula (5) and/or (6) or (11) and/or (12) used as starting material contains a further free amino group which can be condensed or if the vattable compound of the formula (8) and/or (9) contains in addition to the halogen atom Y or Z a free amino group which can be condensed or a further reactive halogen atom, then this amino group can be condensed with a second halo-s-triazine or alkylthio-halo-s-triazine or alkylthio-amino-s-triazine. Provided the second s-triazine does not already contain a vattable radical bound thereto, it can also be condensed subsequently with a further vattable amine or with a further vattable compound which contains halogen. In this way it is possible to manufacture chain-like vat dyestuffs with two or more than two s-triazine radicals or with more than two vattable radicals.

In the s-triazine radicals of the vat dyestuffs so obtained, any halogen atoms still present can also be replaced subsequently by alkylthio groups by reaction with alkylthiols.

The products according to the invention are suitable for dyeing and printing the most diverse materials, in particular for dyeing and printing fibres made from natural or regenerated cellulose in the presence of reducing agents, e.g. dithionite.

The dyeings obtained are characterised by outstanding levelness properties. The fastness properties are in general very good, especially the fastness to light, water, chlorine and boiling soda. The new dyestuffs reserve poyester fibers well and produce tone-in-tone dyeings thereon, which makes them suitable for dyeing fibre blends in admixture with disperse dyes.

Compared with the corresponding vat dyestuffs which contain an alkoxy group instead of the alkylthio group bound to the s-triazine radical, the dyestuffs of the present application are characterised by improved resistance to alkali.

The new dyestuffs can also be used as pigments. Owing to their favourable properties, they can be used for the most varied types of pigment application, e.g. in finely divided form for the colouration of viscose rayon and viscose or of cellulose ethers or esters or of polyamides or polyurethanes or of polyesters in the melt, as well as for the preparation of lacquers and varnishes or of lake-formers, of solutions or products made from acetyl cellulose, nitrocellulose, natural resins or synthetic resins, for example polymerisation resins or condensation resins, e.g. aminoplasts, alkyd resins, phenolic plastics, polyolefins, such as polystyrene, polyvinyl chloride, polyethylene, polypropylene, polyacrylonitrile, rubber, casein, silicone and silicone resins. In addition, the dyestuffs according to the invention can be used with advantage in the manufacture of coloured pencils, cosmetic preparations or laminated sheets.

The following Examples illustrate the invention, the parts and percentages being by part unless otherwise stated.

EXAMPLE 1

3.9 parts of 2,4-dichloro-6-methylthio-s-triazine and 9.2 parts of 1-aminoanthraquinone are stirred for 4 hours at 180°C in 60 parts of volume of nitrobenzene. After the mixture has cooled, the yellow precipitate is filtered off and washed thoroughly with a small amount of nitrobenzene and with methanol. The resulting dyestuff (10.4 parts) of the formula

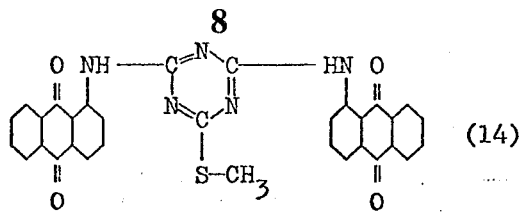

dyes cotton by the vat method in yellow shades having good fastness properties.

EXAMPLE 2

By substituting for the 9.2 parts of 1-aminoanthraquinone in Example 1 the amount indicated in column 1 of anthraquinone listed in column 2 of the following Table, dyestuffs are obtained which dye cotton in the shades indicated in column 3.

| 1 | 2 | 3 |
|---|---|---|
| 14,2 | 1-amino-5-benzoylamino-anthraquinone | golden yellow |
| 15,6 | 1-amino-5-(p-chlorobenzoylamino)-anthraquinone | " |
| 17,2 | 1-amino-5-(p-phenyl-benzoylamino)-anthraquinone | " |
| 13,6 | 1-amino-5-phenylthio-anthraquinone | yellow |
| 14,2 | 1-amino-4-benzoylamino-anthraquinone | red |
| 15,6 | 1-amino-4-(p-chlor-benzoylamino)-anthraquinone | red |
| 18,5 | 1-amino-4-[p-(N,N-dimethylsulphamido)-benzoylamino]-anthraquinone | red |
| 17,2 | 1-amino-4-(p-phenyl-benzoylamino)-anthraquinone | red |
| 10,4 | 1-amino-4-methoxy-anthraquinone | orange |
| 13,0 | 1-amino-4-anilido-anthraquinone | blue |
| 9,8 | 1-amino-2-methyl-anthraquinone | yellow |
| 10,6 | 1-amino-3-chloro-anthraquinone | yellow |
| 10,6 | 1-amino-7-chloro-anthraquinone | yellow |
| 10,6 | 1-amino-5-chloro-anthraquinone | yellow |
| 11,6 | 1,4-diamino-2-acetyl-anthraquinone | blue |
| 9,2 | 2-aminoanthraquinone | yellow |
| 15,8 | 1-amino-4-(p-toluolsulphonylamino)-anthraquinone | red |
| 13,6 | 1-amino-4-phenylthio-anthraquinone | red |
| 10,6 | 1-amino-4-chloroanthraquinone | yellow |
| 11,6 | 1-amino-6,7-dichloroanthraquinone | yellow |

EXAMPLE 3

11.75 parts of 2,4-dichloro-6-methylthio-s-triazine and 42 parts of 2-amino-3,4-phthaloylacridone are stirred for 8 hours at 170°C in 400 parts of nitrobenzene in the presence of 1 part of pyridine. After the mixture has cooled, the dyestuff is isolated in the usual way. It has the formula

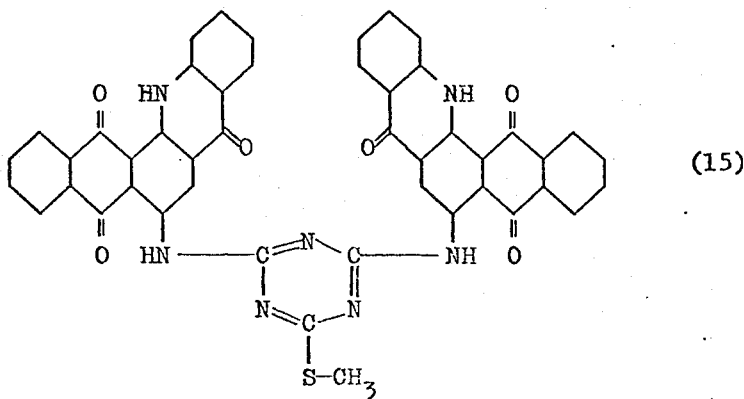

and dyes cotton by the vat method in blue shades having good fastness properties.

A dyestuff with similar properties is obtained by substituting 46.2 parts of 2-amino-6- or 2-amino-7-chloro-3,4-phthaloylacridone or 50 parts of 2-amino-5,7-dichloro-3,4-phthaloylacridone or 50.7 parts of 2-amino-6-trifuluoroemthyl-3,4-phthaloylacridone for the 42 parts of 2-amino-3,4-phthaloylacridone.

A dyestuff that produces a violet dyeing is obtained with 46.2 parts of 8-amino-5-chloro-3,4-phthaloylacridone.

EXAMPLE 4

Analogous dyestuffs with similar shades and fastness properties are obtained by substituting the equivalent amounts of 2,4-dichloro-6-ethylthio-s-triazine, 2,4-dichloro-6-propylthio-s-triazine, 2,4-dichloro-6-isopropylthio-s-triazine or of 2,4-dichloro-6-butylthio-s-triazine for the 2,4-dichloro-6-methylthio-s-triazine used in Examples 1, 2 and 3.

EXAMPLE 5

A solution of 0.55 parts of copper-(I)-iodide in 3 parts of pyridine is added to a suspension consisting of 10 parts of 1-chloroanthraquinone, 3.15 parts of 2,4-diamino-6-methylthio-s-triazine and 5.3 parts of sodium carbonate in 70 parts of nitrobenzene and the mixture is heated over the course of 1 hour to 180°C. The mixture is then stirred at this temperature for 4 hours. The reaction mass is cooled to 80°C, filtered, and the residue is washed thoroughly with nitrobenzene, then with methanol and water. Any copper present is removed by stirring the yellow dyestuff in dilute nitric acid for ½ hour at 80°C. It is then filtered off, washed neutral and dried to yield 10.2 parts of a yellow dyestuff that is identical in every respect with the dyestuff obtained according to Example 1.

EXAMPLE 6

3.9 parts of 2,4-dichloro-6-methylthio-s-triazine and 7 parts of 2-amino-3,4-phthaloylacridone are stirred in 50 parts of nitrobenzene for 3 hours at 140°–145°C. Then 7.1 parts of 1-amino-5-benzoylamino-anthraquinone and a further 50 parts of nitrobenzene are added and stirring is continued for 8 hours. After the batch has cooled, processing is carried out in the usual way to yield 12.5 parts of an olive dyestuff which corresponds essentially to the dyestuff of the formula

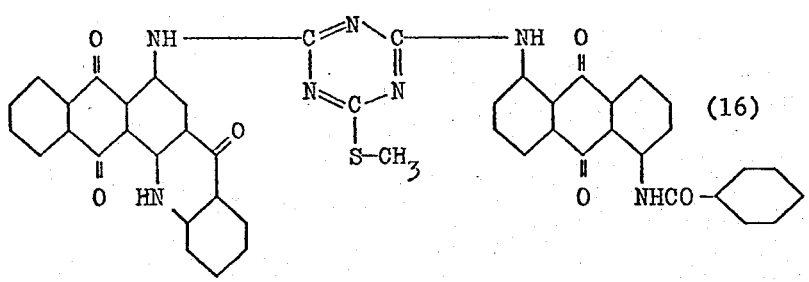

and dyes cotton by the vat method in fast, olive shades.

EXAMPLE 7

10.1 parts of the monocondensate of the formula

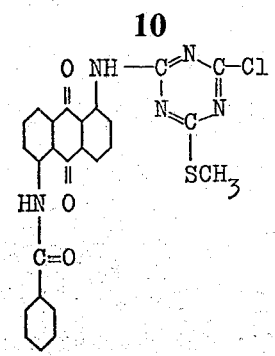

(obtained by reaction of 1-amino-5-benzoylaminoanthraquinone in o-dichlorobenzene with a surplus of 2-methylthio-4,6-dichlorotriazine) are stirred with 4.6 parts of 1-aminoanthraquinone in 60 parts by volume of nitrobenzene for 5 hours at 180° to 185°C and then for 1 hour at reflux temperature. After the mixture has cooled, the yellow precipitate is filtered off and washed first with nitrobenzene and then thoroughly with methanol to yield 10.5 parts of the dyestuff of the formula

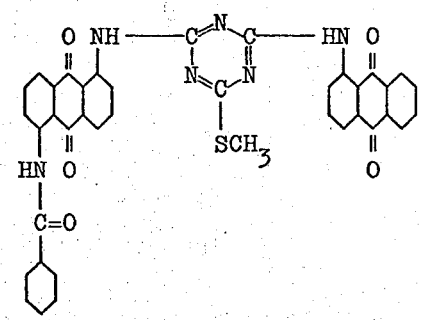

which dyes cotton in yellow shades.

EXAMPLE 8

By substituting for the 4.6 parts of 1-aminoanthraquinone in Example 7 the amounts indicated in column 1 of the amino compounds listed in column 2 of the following Table, dyestuffs are obtained which dye cotton in the shades indicated in column 3 in accordance with dyeing Procedure 1.

| 1 | 2 | 3 |
|---|---|---|
| 4,6 | 2-aminoanthraquinone | yellow |
| 7,1 | 1-amino-4-benzoylaminoanthraquinone | orange |
| 5,2 | 1-amino-4-methoxyanthraquinone | orange |
| 5,8 | 1,4-diamino-2-acetyl-anthraquinone | olive |
| 7,0 | 2-amino-3,4-phthaloylacridone | olive |
| 5,1 | Bz-1-amino-benzanthrone | |
| 5,4 | Bz-1-amino-2-methyl-benzanthrone | yellow |
| 5,2 | 5-amino-isothiazolanthrone | yellow |
| 6,5 | 1-phenyl-5-amino-anthrapyrimidine | yellow |

EXAMPLE 9

10.3 parts of the monocondensate described in Example 7 and 4.55 parts of 4,4'-diamino-1,1-dianthrimide-2,2'-carbazole are stirred together for 3 hours at 190° to 195°C and then for a further 3 hours under reflux in 100 parts of nitrobenzene in the presence of 0.1 part of copper-(I)-iodide. The batch is filtered at 100°C and the product is washed with a small amount of hot nitrobenzene and then thoroughly with methanol to yield 12.5 parts of a blackish brown dyestuff of the formula

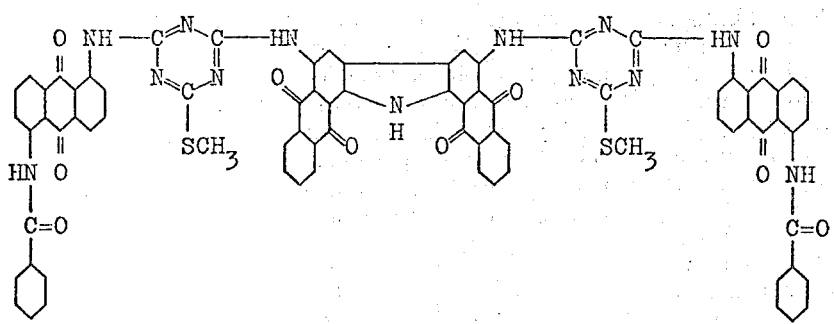

which dyes cotton by the vat method in reddish brown shades.

EXAMPLE 10

11.2 parts of the intermediate of the formula

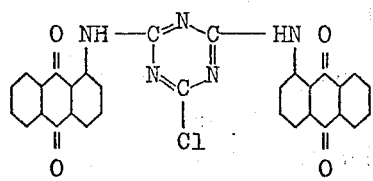

and 3.3 parts of sodium butyl mercaptide are stirred together under reflux in 75 parts by volume of dimethyl formamide until no more halogen can be detected in an isolated sample. After the mixture has cooled, the dyestuff is isolated by filtration and washed with water and then dried. The resulting dyestuff of the formula

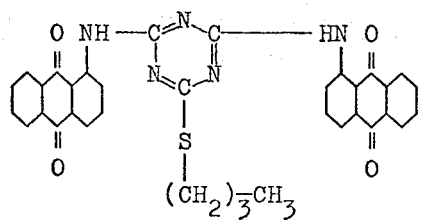

dyes cotton according to Dyeing Procedure I in yellow shades.

DYEING PROCEDURE I 1 part of dyestuff is vatted at 50°–70°C with 10 parts by volume of sodium hydroxide having a specific gravity of 36° Be and 5 parts of sodium hydrosulphite in 200 parts of water. The above stock vat is added to a dyebath which contains in 2000 parts of water 5 parts by volume of sodium hydroxide solution with a specific gravity of 36° Be and 3.7 parts of sodium hydrosulphite. 100 parts of cotton are put into this bath at 40°C. After 10 minutes, 15 parts of sodium chloride are added and after 20 minutes a further 15 parts are added and dyeing is performed for 45 minutes at 40°C. The cotton is squeezed out, oxidised, and finished in the usual manner.

DYEING PROCEDURE II 1 part of the dyestuff obtained according to Example 1 and 0.5 part of CI Disperse Yellow 84 are ground wet with 2.5 parts of a 50% aqueous solution of the sodium salt of dinaphthylmethanedisulphonic acid. A dyebath is prepared with this dyestuff preparation, 2 parts of ammonium sulphate and 1000 parts of water and its pH is brough to 6.0 to 6.9 with monosodium phosphate. 100 parts of a cotton/polyester blend (67%PE) is put into this bath and the temperature is raised over the course of 45 minutes to 120°–125°C. Dyeing is performed for 60 minutes at this temperature in a sealed vessel. The bath is allowed to cool to 60°–70°C and 20 parts by volume of sodium hydroxide having a specific gravity of 36° Be and 5 parts of sodium hydrosulphite are added. After 45 minutes the fabric is squeezed, oxidised and finished in the usual manner.

PIGMENT COLOURATION 5 parts of the first dyestuff listed in the Table of Example 2 are mixed with 95 parts of dioctyl phthalate and ground in a ball mill until the particles are smaller than 3μ. 0.8 part of this dioctyl phthalate paste is mixed with 13 parts of polyvinyl chloride, 7 parts of dioctyl phthalate and 0.1 of cadmium stearate and this mixture is then rolled to and for 5 minutes in a twinroller mill at 140°C. A material having a yellow colouration with good migration properties and good fastness to light is obtained.

COLOURATION OF LACQUERS 10 g of titanium dioxide and 2 g of the fifth pigment listed in the Table of Example 2 are ground in a ball mill for 48 hours together with a mixture of 26.4 g of coconut alkyd resin, 24.0 g of melamine-formaldehyde resin (50% solids content), 8.8 g of ethylene glycol monomethyl ether and 28.8 g of xylene.

By spraying this lacquer on an aluminium sheet, predrying it for 30 minutes at room temperature and then stoving it for 30 minutes at 120°C, there is obtained a clear, deep red lacquering characterised by good fastness to over-lacquering, outstanding fastness to light and good fastness to weathering.

I claim:

1. A vat dyestuff of the formula

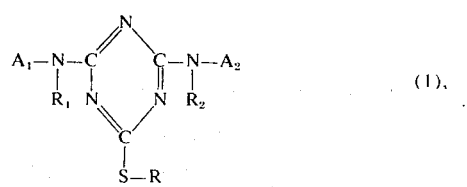

wherein R is alkyl with 1 to 4 carbon atoms, $R_1$ and $R_2$ each is independently hydrogen or alkyl with 1 to 4 carbon atoms and $A_1$ and $A_2$ each is independently anthraquinonyl which is optionally substituted by halogen, lower alkyl, lower alkoxy, lower alkanoyl, amino, phenylamino, benzoylamino, halobenzoylamino, phenylbenzoylamino, N,N-diloweralkyl-sulphamidobenzoylamino, lower alkylphenylsulphonylamino and phenylthio, phthaloylacridonyl which is optionally substituted by halogen and trifluoromethyl, benzanthronyl which is optionally substituted by lower alkyl, isothiazolanthronyl, phenylanthrapyrimidinyl and 4-(benzoylaminoanthraquinonyl)-6-lower alkylthio-s-triazin-(2)-yl-amino-1,1'-dianthrimide-2,2'-carbazole.

2. A vat dyestuff according to claim 1 of the formula

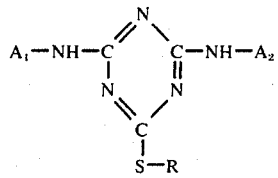

(2), wherein R is alkyl with 1 to 4 carbon atoms and $A_1$ and $A_2$ each is independently anthraquinonyl which is bound in 1- or 2-position and which is optionally substituted by halogen, lower alkyl, lower alkoxy, lower alkanoyl, amino, phenylamino, benzoylamino, halobenzoylamino and phenylthio, or is 3,4-phthaloylacridonyl which is bound in 2- or 8-position and which is optionally substituted by halogen.

3. A vat dyestuff according to claim 2, of the formula

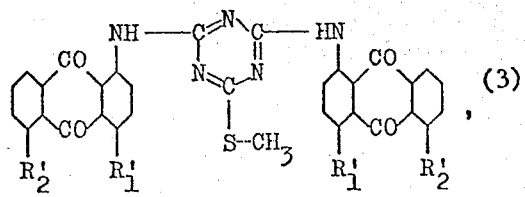

(3), wherein one of the two substituents $R_1'$ and $R_2'$ is hydrogen and the other is benzoylamino.

* * * * *